Dec. 15, 1942.    L. W. BARNHART    2,304,875
APPARATUS FOR MEASURING LIQUID IN A GAS-LIQUID MIXTURE
Filed July 11, 1939
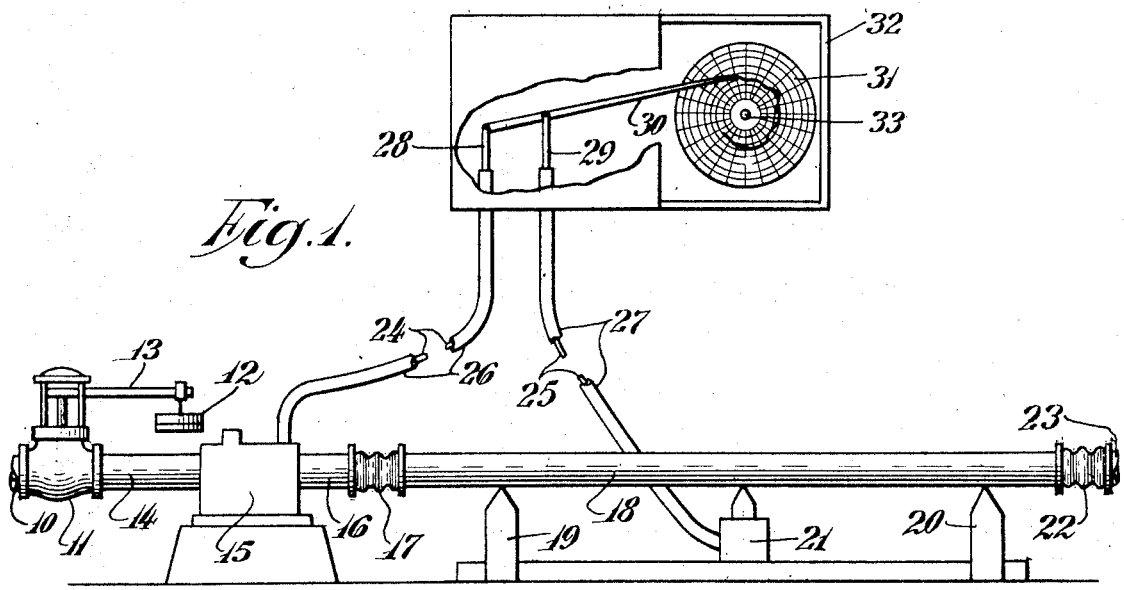
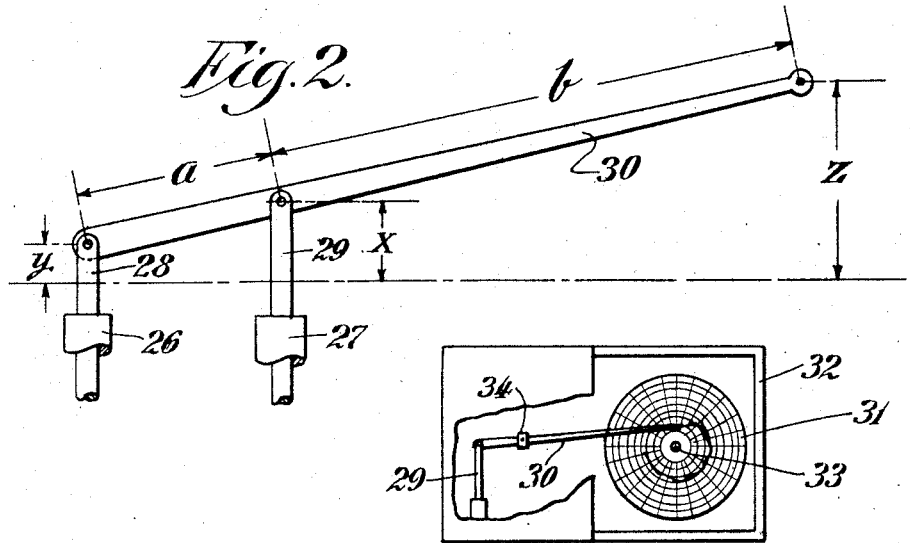
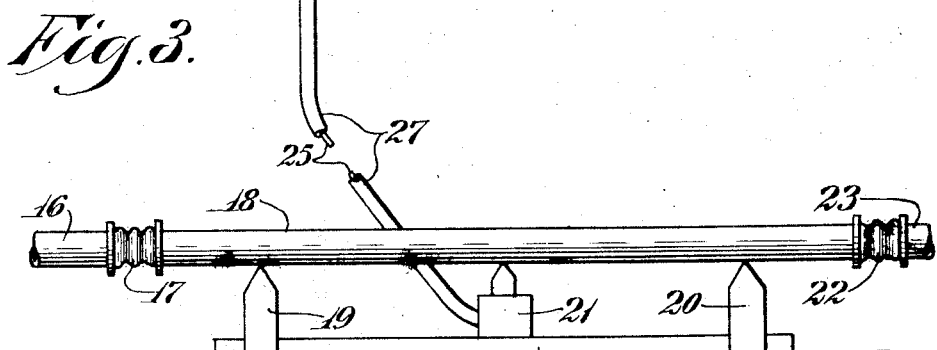
Inventor:
Leroy W. Barnhart
By Geo. L. Parkhurst
Attorney.

Patented Dec. 15, 1942

2,304,875

UNITED STATES PATENT OFFICE 2,304,875

APPARATUS FOR MEASURING LIQUID IN A GAS-LIQUID MIXTURE

Leroy W. Barnhart, Tulsa, Okla., assignor to Stanolind Oil and Gas Company, Tulsa, Okla., a corporation of Delaware Application July 11, 1939, Serial No. 283,815

3 Claims. (265—27)

This invention pertains to the art of measuring the quantity of liquid in a mixture of gas and liquid.

In certain applications it is necessary to measure with accuracy the quantity of liquid passing a given point in a given line, although the liquid may be mixed with a considerable quantity of gas. One example of the need for such measurements is in the metering of the quantity of crude oil flowing from a well. Very often the oil is mixed or even emulsified with natural gas coming from the well. Although it is common practice to separate the gas from the oil before metering the latter, often the same separator is used on the combined input from a number of wells, so that all that is measured is the total quantity of liquid from the various wells. The insertion of normal meters used for measuring liquid in each line is valueless in this case because such meters measure the total volume of fluid passing a given point without regard to the proportion of the fluid that is in liquid form. Separators could be used in each line, but this involves considerable extra apparatus which is not always satisfactory in operation, and is seldom economically justifiable.

It is an object of my invention to provide a simple and efficient apparatus for weighing the material passing through a line. It is a more particular object of my invention to provide a simple and efficient apparatus for weighing a gas-liquid mixture flowing through a line. Still more particularly it is one of my objects to provide an apparatus for determining the amount of liquid in a gas-liquid mixture while this mixture is flowing through a line.

A further object of my invention is to measure the amount of liquid flowing through a line while compensating automatically for the presence of gas. It is also an object of my invention to record automatically the quantity of liquid in a gas-liquid mixture flowing through a line regardless of the relative proportions of the gaseous and liquid phases. Another object is to accomplish these results by the use of simple and inexpensive equipment.

Other and more detailed objects, advantages and uses of my invention will become apparent as the description thereof proceeds.

One specific embodiment of this invention will be described in connection with the following drawing which forms a part of this specification and in which Figure 1 shows in diagrammatic form the apparatus necessary to carry out my invention;

Figure 2 shows an enlarged detail of a portion of the meter shown in Figure 1; and Figure 3 shows a simplified alternative apparatus.

In brief, I measure the quantity of liquid in the mixture by measuring the total volume of the fluid passing a given point in a line, this point being maintained at a predetermined pressure, and simultaneously measuring the weight of the material passing a point close to the first point.

From these values and the knowledge of the density of the liquid and gas at the maintained pressure, I can either compute or record automatically the quantity of liquid flowing through the line.

Referring now more specifically to Figure 1, I have shown a line 10 through which the mixture of gas and liquid is passing. A pressure regulator 11 is used to maintain a constant pressure in the remainder of the flow line shown in the figure. This is accomplished by means of weight 12 on lever arm 13. The mixture now flows through line 14 into a positive displacement meter 15, in which the total volume of fluid passing per unit time is measured in a manner known to the art. From here the mixture passes through line 16 and flexible coupling 17, which may be a Dresser coupling or the like, to a weighmeter comprising a section of pipe or other conduit 18, preferably made of seamless tubing, two supports 19 and 20, and a deflectometer 21. From this section of the line the gas and liquid mixture passes through flexible coupling 22, similar to coupling 17, and flows through line 23 to its destination.

The weigh-meter which has been described, operates on the principle that a container which is supported as a beam at two points and which is preferably relatively free to move at the ends, will suffer a deflection at the mid-point between the two supports which is proportional to the weight of the material flowing through the container. Within reasonable limits the deflection of the mid-point of the container will vary linearly with this weight. It is thus evident that by the equipment described so far, I can measure at constant pressure the volume of the mixture passing in a given time and the weight of the mixture passing in a given time. These quantities must be combined in order to determine the quantity of liquid passing. An analysis will illustrate the processes which must be carried out. Let $Q_g$ = volume of gas passing per unit time,
$Q_l$ = volume of liquid passing per unit time,
$Q$ = total volume of the mixture passing per unit time
$= Q_g + Q_l$,
$W_g$ = weight of gas passing per unit time,
$W_l$ = weight of liquid passing per unit time,
$W$ = weight of the mixture passing per unit time
$= W_g + W_l$, and finally $d_g$ = density of gas, and $d_l$ = density of liquid.

These last two quantities must be measured at the pressure determined by the pressure regulator, and having once been determined, need not be remeasured until the composition of the liquid or gas changes.

Now $$W_g = Q_g d_g \quad (1)$$
$$W_l = Q_l d_l \quad (2)$$

and $$W_g + W_l = Q_g d_g + Q_l d_l = W \quad (3)$$

but since $$Q_g = Q - Q_l \quad (4)$$

Equation 3 can be written $$W = Q_l d_l + (Q - Q_l) d_g \quad (5)$$
$$= Q_l (d_l - d_g) + Q d_g \quad (6)$$

and therefore $$Q_l = \frac{W - Q d_g}{d_l - d_g} \quad (7)$$

W is measured by the weigh-meter and Q is measured by the displacement meter, hence all quantities on the right hand side of the equation are known and $Q_l$ can be determined.

It will be noted that this equation holds true regardless of the rate of flow or of the proportion of the gas to liquid in the mixture.

Although it is possible to make a continuous record of the quantity of fluid passing per unit time and the corresponding weight of the mixture in the same or another unit of time and calculate from these records the quantity of liquid passing, it is simpler to set up a meter which will record the resultant quantity of liquid automatically. This can be accomplished in a great many different ways.

By way of illustration I have shown diagrammatically in Figure 1 and Figure 2 one possible mechanism for accomplishing this result. Two flexible cables 24 and 25 lead respectively from the displacement meter 15 and from the deflectometer 21 to the recording meter 32. The cables are constrained to move axially in the direction of their sheaths 26 and 27 respectively, and are so attached to displacement meter 15 and deflectometer 21 that their motions along the direction of the cables are linearly proportional to the quantity of the mixture passing per unit time and the deflection of the deflectometer, respectively. These cables terminate in rods 28 and 29 which are pivotably attached to a recording pen lever 30. As shown in Figures 1 and 2 the rods 28 and 29 at the ends of the cables 24 and 25 are constrained to move in approximately parallel lines and are attached to the pen lever 30 a distance $a$ apart. The distance from the pivot point for rod 29 to the pen is a second distance $b$. A recording disc 31 is provided and may suitably be driven by a clock work motor with, say, a 24 hour movement. Disc 31 carries on its face a paper chart on the surface of which the pen (or pencil) at the extremity of arm 30 records on a suitable scale the quantity of liquid passing at any time. The axis 33 of disc 31 is preferably positioned so that it is on the circumference of a circle having a radius equal to $a+b$ enscribed about the rest position of the pivot between members 28 and 30, although this is not an absolute necessity.

In Figure 2 is shown an enlarged portion of the meter in order to demonstrate that the motion $z$ of the pen from its rest position is proportional to $Q_l$. In this figure, $x$ is the displacement of member 29 from its rest position and is accordingly directly proportional to the movement of the deflectometer, hence is proportional to W. Similarly $y$ is the deflection of member 28 from its rest position and is consequently proportional to Q. It is easily shown that $$z = y + (x - y) \frac{a+b}{a} \quad (8)$$

$$= x \frac{a+b}{a} - y \frac{b}{a} \quad (9)$$

$$= \frac{a+b}{a} \left( x - y \frac{b}{a+b} \right) \quad (10)$$

Since $x$ is proportional to W and $y$ to Q we can say that the deflection $$z = \frac{a+b}{a} \frac{1}{k} \left( W - Q \frac{b}{a+b} \right) \quad (11)$$

where $k$ is a proportionality constant.

It can be seen by inspection that Equation 11 is in the same form as Equation 7 given above for $Q_l$, so that if we make $$\frac{b}{a+b} = d_g \quad (12)$$

and choose an appropriate scale for the recording paper, the deflection $z$ will be read directly as $Q_l$.

As stated above I do not wish to be limited to this particular type of meter as this is but one of many types which could be used.

It is possible to eliminate the need for the type of displacement indication meter described by using a positive displacement mechanism set to deliver a predetermined volume, in which case all quantities but W in Equation 7 are fixed and a simple recording weigh-meter can be used to determine the quantity of liquid flowing through the line. In fact, in many instances the volume flowing per unit time and the pressure will be substantially constant due to the nature of the pumping system and the simplified apparatus of Figure 3 can be used. A recording volume meter can be used as a check on the accuracy of the readings obtained with the apparatus of Figure 3.

In Figure 3 a fixed pivot 34 replaces the moving pivot between rod 28 and pen lever arm 30 so that the motion of the pen is in accordance with some function of the deflection, or in other words to some function of the weight of material passing through that portion of pipe 18 between supports 19 and 20.

While I have illustrated my invention in terms of certain specific embodiments, I do not intend to be limited to them but only to apparatus embodying the principles discussed in connection with these embodiments and defined in the appended claims.

I claim:

1. Apparatus for measuring the amount of liquid in a gas-liquid mixture flowing through a portion of a line, comprising a pipe forming a portion of said line, flexible connections at either end of said pipe connecting it with the remainder of said line, two spaced fixed supports for said pipe disposed between said flexible connections, valve means for introducing said gas liquid mixture into said portion of said line under substantially constant pressure, means responsive to the deflection of a portion of said pipe disposed between said fixed supports and means for recording a function of said deflection.

2. Apparatus for measuring the amount of liquid in a gas-liquid mixture flowing through a line, comprising means for suspending a portion of said line as a simple beam, means for maintaining a substantially constant pressure on the gas-liquid mixture flowing through said suspended portion of said line, a positive displacement means adapted to deliver a predetermined volume to said portion of said line, a deflectometer responsive to the deflection of said portion of said line suspended as a simple beam and means for recording a function of said deflection.

3. Apparatus for measuring the amount of liquid in a gas-liquid mixture flowing through a line, comprising means for suspending a portion of said line as a simple beam, means for maintaining a substantially constant pressure on the gas-liquid mixture flowing through said portion of said line, a positive displacement means adapted to deliver a predetermined volume to said portion of said line, means responsive to the deflection of said portion of said line suspended as a beam, means responsive to the volume of said gas-liquid mixture flowing through an associated portion of said line in unit time and recording means responsive conjointly to both of said aforementioned responsive means.

LEROY W. BARNHART.